(12) United States Patent
Nakayama et al.

(10) Patent No.: US 9,831,652 B2
(45) Date of Patent: Nov. 28, 2017

(54) WIRING MODULE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Osamu Nakayama, Mie (JP); Mitsutoshi Morita, Mie (JP); Naoki Fukushima, Mie (JP); Tetsuya Fujita, Mie (JP)

(73) Assignees: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/114,529

(22) PCT Filed: Jan. 16, 2015

(86) PCT No.: PCT/JP2015/051021
§ 371 (c)(1),
(2) Date: Jul. 27, 2016

(87) PCT Pub. No.: WO2015/118923
PCT Pub. Date: Aug. 13, 2015

(65) Prior Publication Data
US 2016/0359309 A1 Dec. 8, 2016

(30) Foreign Application Priority Data
Feb. 6, 2014 (JP) ................................ 2014-021362

(51) Int. Cl.
*H02G 3/04* (2006.01)
*H02G 5/02* (2006.01)
(Continued)

(52) U.S. Cl.
CPC ........... *H02G 5/025* (2013.01); *B60R 16/033* (2013.01); *H01M 2/1077* (2013.01);
(Continued)

(58) Field of Classification Search
USPC ....................................................... 439/500
See application file for complete search history.

(56) References Cited

U.S. PATENT DOCUMENTS 6,346,011 B1 * 2/2002 Ikeda .................. H01M 2/1077
439/500
9,209,550 B2 * 12/2015 Kinoshita ............. H01M 2/206
(Continued)

FOREIGN PATENT DOCUMENTS

EP 2669972 A1 12/2003
EP 2669972 A1 * 12/2013 .......... H01M 2/1077
(Continued)

OTHER PUBLICATIONS

International Search Report.
European Search Report Dated Oct. 31, 2016.

*Primary Examiner* — Timothy Thompson
*Assistant Examiner* — Krystal Robinson
(74) *Attorney, Agent, or Firm* — Gerald E. Hespos; Michael J. Porco; Matthew T. Hespos

(57) ABSTRACT

A wiring module includes a busbar for connecting between electrode terminals, an external connection busbar to be connected to an external terminal, a resin protector including a first holding portion for holding the busbar and a second holding portion for holding the external connection busbar and a main cover for covering the first holding portion. The (Continued)

main cover includes a first auxiliary cover for covering the second holding portion and a second auxiliary cover connected to the first auxiliary cover via a hinge portion. The first auxiliary cover is provided with an interfered portion for interfering with an interfering portion of the second holding portion as the main cover is mounted on the resin protector, and the first auxiliary cover is automatically rotated and arranged at a predetermined position by the interference of the interfered portion and the interfering portion.

9 Claims, 15 Drawing Sheets

(51) Int. Cl.
| | | |
|---|---|---|
| H01M 2/30 | (2006.01) | |
| H01M 2/10 | (2006.01) | |
| H01M 2/20 | (2006.01) | |
| B60R 16/033 | (2006.01) | |

(52) U.S. Cl.
CPC ......... *H01M 2/1094* (2013.01); *H01M 2/206* (2013.01); *H01M 2/30* (2013.01); *H02G 3/04* (2013.01); *H01M 2220/20* (2013.01)

(56) References Cited

U.S. PATENT DOCUMENTS

| | | |
|---|---|---|
| 9,412,989 B2 | 8/2016 | Kinoshita |
| 2001/0049055 A1* | 12/2001 | Saito ................... H01M 2/1077 |
| | | 429/175 |
| 2006/0183367 A1* | 8/2006 | Saito ...................... H01R 11/26 |
| | | 439/500 |
| 2011/0064986 A1 | 3/2011 | Ogasawara et al. |
| 2014/0315441 A1 | 10/2014 | Kinoshita |
| 2015/0070025 A1 | 3/2015 | Nakayama et al. |
| 2015/0228955 A1 | 8/2015 | Nakayama et al. |

FOREIGN PATENT DOCUMENTS

| | | |
|---|---|---|
| JP | 2004-134278 | 4/2004 |
| JP | 2011-8955 | 1/2011 |
| JP | 2011-67012 | 3/2011 |
| WO | 2014/002682 | 1/2014 |
| WO | 2014/024760 | 2/2014 |

* cited by examiner

WIRING MODULE

BACKGROUND

1. Field of the Invention

The present invention relates to a wiring module.

2. Description of the Related Art

A battery module mounted, for example, in a vehicle such as an electric vehicle or a hybrid vehicle is generally configured such that a multitude of unit cells are connected in series via busbars.

As an example of such a battery module, a battery module is known which is assembled by mounting a wiring module with busbars and a wire group on a unit cell group formed by arranging a plurality of unit cells (see Japanese Unexamined Patent Publication No. 2011-8955).

The wiring module described in Japanese Unexamined Patent Publication No. 2011-8955 includes a plurality of busbars held at predetermined positions of a resin protector and a plurality of wires (wire group) accommodated in wire arrangement grooves provided in the resin protector.

A wiring module has a role of connecting a plurality of unit cells and supplying power to another external device or the like and, in many cases, includes an external connection terminal connected to the other device or the like to supply power. Since there is a risk of an electric shock if this external connection terminal is directly contacted, the wiring module needs to be provided with a cover member for covering the external connection terminal to keep insulation.

Such a cover member needs to be removed (to expose the external connection terminal) every time the external connection terminal and the other device are connected and disconnected, it is preferably integrally provided to the wiring module in view of operability. As an example of such a configuration, it is thought to unite a cover member for covering an external connection terminal and a busbar cover for covering busbars via a hinge portion and make the cover member openably and closably rotatable with respect to the busbar cover.

However, depending on the shape of a product, the hinge portion enabling the cover member to be openably and closably rotatable in directions to provide good operability cannot be provided due to molding restrictions in some cases.

Accordingly, it is thought to provide the cover member with a second hinge portion perpendicular to the hinge portion (hereinafter, referred to as a first hinge portion) linking the busbar cover and the cover member for covering the external connection terminal and rotate the cover member in two stages by the first and second hinge portions, thereby combining good opening and closing directions and moldability.

However, in the case of performing the rotation in two stages in this way, a fixing operation of stably holding the cover member at a predetermined position after the rotation by the first hinge portion is necessary to reliably set opening and closing rotation directions by the second hinge portion at arbitrary directions. This causes problems of complicating a structure and increasing man-hours.

The present invention was completed based on the above situation.

SUMMARY

To solve the above problems, the present invention is directed to a wiring module to be mounted on an electrical storage element group formed by arranging a plurality of electrical storage elements including positive and negative electrode terminals, the wiring module including a connecting member for connecting between adjacent ones of the electrode terminals, an external connecting member including an external connection terminal to be connected to another device, an insulating holding member including a first holding portion for holding the connecting member and a second holding portion for holding the external connecting member, and a main cover for covering the first holding portion, wherein the main cover is integrally provided with an auxiliary cover for covering the second holding portion via a first hinge portion, the auxiliary cover includes a first auxiliary cover connected to the first hinge portion and a second auxiliary cover integrally coupled to the first auxiliary cover via a second hinge portion perpendicular to the first hinge portion, and the first auxiliary cover includes an interfered portion for interfering with an interfering portion provided on the insulating holding member as the main cover is mounted on the insulating holding member, the first auxiliary cover is rotated with the first hinge portion as a rotary axis by the interference of the interfering portion and the interfered portion, and the first auxiliary cover is arranged at a predetermined position with the main cover mounted on the insulating holding member.

According to the above configuration, the first auxiliary cover is automatically rotated with the first hinge portion as a rotary shaft by the interference of the interfered portion with the interfering portion of the insulating holding member as the main cover is mounted on the insulating holding member, and arranged at the predetermined position for covering the second holding portion with the main cover mounted on the insulating holding member. Thus, it is not necessary to rotate and fix the first auxiliary cover, the structure thereof can be simplified and man-hours can be reduced.

The above wiring module may have the following configurations.

The external connecting member may include a base portion, an erected portion erected from the base portion and the external connection terminal provided to project from the erected portion, the second holding portion may include a holding wall surrounding the base portion, the interfering portion may be an erected wall erected from the holding wall for covering a surface of the erected portion opposite to the one where the external connection terminal is provided, and the interfered portion may be a wall portion connected to the first hinge portion out of the first auxiliary cover.

By adopting this configuration, a specific form of the present invention can be realized. Further, since the erected wall and the wall portion originally necessary as constituent elements can be utilized as the interfered portion and the interfering portion, it is not necessary to separately provide the interfered portion and the interfering portion and the structure can be more simplified.

Further, the erected wall may be formed with an inclined rotation guiding portion for guiding the rotation of the first auxiliary cover by coming into contact with the wall portion. By adopting this configuration, the first auxiliary cover is more smoothly rotated.

Further, the first auxiliary cover and the second holding portion may be provided with posture guiding portions for bringing the interfered portion of the first auxiliary cover in a proper posture into contact with the interfering portion prior to the rotation of the first auxiliary cover. By adopting this configuration, the first auxiliary cover is even more smoothly rotated.

Further, the first auxiliary cover may include a rotation restricting portion for restricting excessive rotation of the first auxiliary cover. By adopting this configuration, the first auxiliary cover is more stably arranged at the predetermined position for covering the second holding portion.

Furthermore, the main cover may be integrally provided to the insulating holding member via a main body hinge portion. By adopting this configuration, the number of components can be reduced. Further, the first auxiliary cover is automatically rotated as the main cover is rotated with respect to the insulating holding member.

According to the present invention, it is possible to provide a wiring module having a simple configuration and a small number of man-hours.

DETAILED DESCRIPTION

Figure 1:
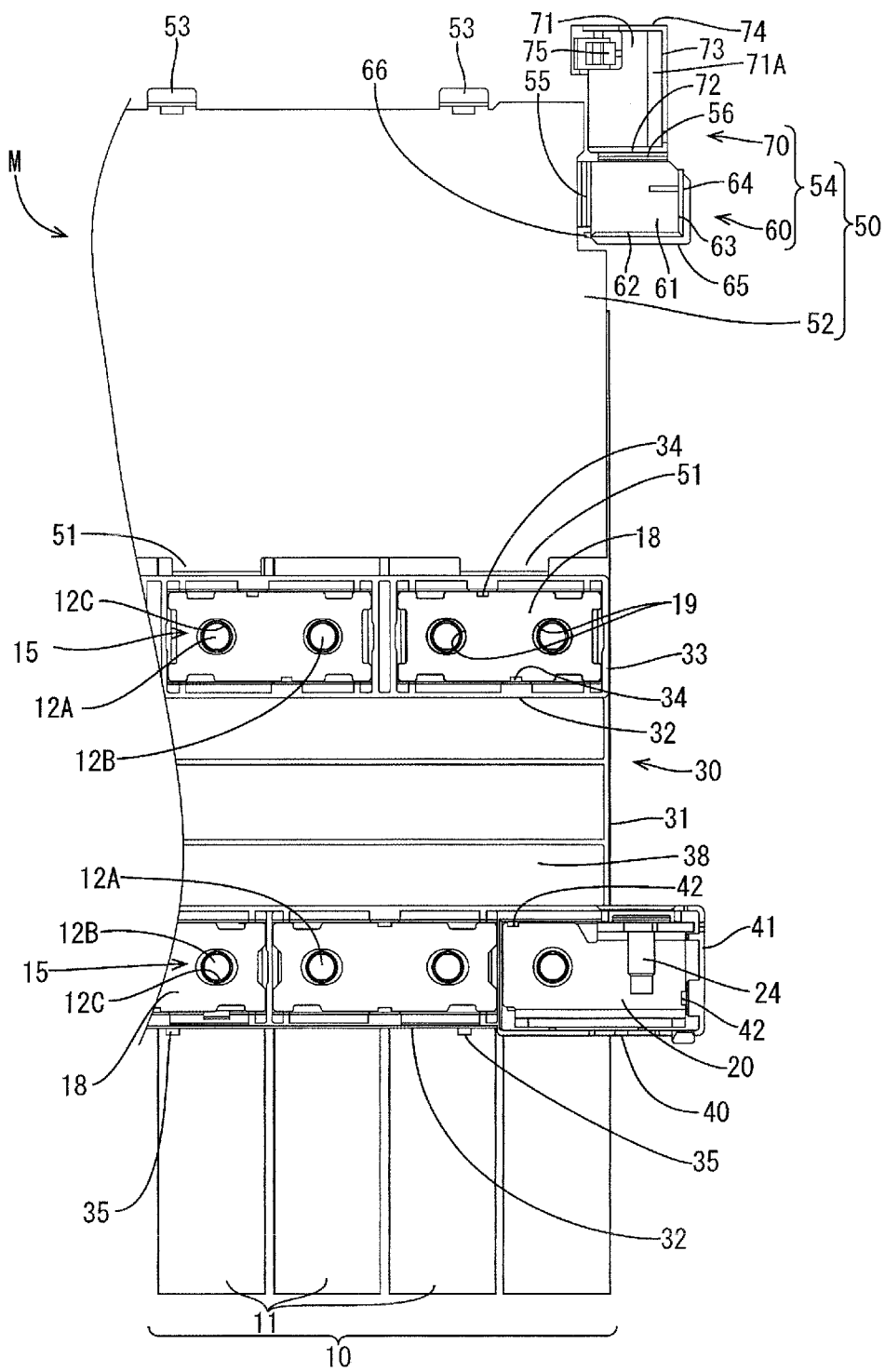
FIG. 1 is a plan view showing a state where a lid portion of a battery wiring module of one embodiment is opened.

One embodiment is described with reference to FIGS. 1 to 15. In the following description, lower and upper sides in FIG. 1 are referred to as front and rear sides and right and left sides in FIG. 1 are referred to as right and left sides, and upper and lower sides in FIG. 3 are referred to as upper and lower sides.

A wiring module 30 of this embodiment is such that adjacent electrode terminals 12 of a plurality of arranged unit cells 11 (an example of electrical storage elements) are connected by busbars 18. An electrical storage module M mounted with this wiring module 30 is, for example, used as a drive source for a vehicle such as an electric vehicle or a hybrid vehicle.

(Electrical Storage Module M)

The electrical storage module M includes a unit cell group 10 (an example of an electrical storage element group) formed by arranging a plurality of unit cells 11 and the wiring module 30 for connecting adjacent ones of the unit cells 11.

(Unit Cell 11)

The unit cell 11 is such that electrode terminals 12 perpendicularly project from the upper surface of a main body in the form of a flat rectangular parallelepiped accommodating an unillustrated power generating element inside. The electrode terminals 12 are composed of a pair of a positive terminal 12A and a negative terminal 12B. An arbitrary electrical storage element such as a condenser or a capacitor can be selected as the electrical storage element.

The electrode terminal 12 is a nut (square nut) in the form of a rectangular tube and a circular screw hole 12C is formed to penetrate in a center. By threadably engaging shaft parts (not shown) of bolts with the screw holes 12C of these electrode terminals 12, the busbar 18 to be described later and a voltage detection terminal (not shown) are fixed.

The plurality of unit cells 11 are so arranged that the adjacent electrode terminals 12 have opposite polarities and constitute the unit cell group 10. Two rows of electrode groups 15 are formed on the upper surface of the unit cell group 10 (see FIG. 1).

(Wiring Module 30)

As shown in FIG. 1, the wiring module 30 includes a plurality of busbars 18 (an example of a connecting member) for connecting between adjacent electrode terminals 12 of different unit cells 11, external connection busbars 20 (an example of an external connecting member) including a connection terminal 24 to be connected to the electrode terminal 12 on an end part of the unit cell group 10 and electrically connected to an external device, and a resin protector 31 (an example of an insulating holding member) for holding the busbars 18 and the external connection busbars 20.

(Busbar 18)

The busbar 18 is formed by press-working a plate material made of metal such as copper, copper alloy, stainless steel (SUS) or aluminum into a predetermined shape, and has a substantially rectangular shape as a whole. Metal such as tin or nickel may be plated on a surface of the busbar 18.

As shown in FIG. 1, the busbar 18 is formed with a pair of elliptical through holes 11 through which the shaft parts of the bolts are to be inserted and which penetrate through the busbar 18. These through holes 19 are set to have a diameter slightly larger than that of the shaft parts of the bolts. The shaft parts of the bolts are inserted through the through holes 19 and threadably engaged with the screw holes 12C of the electrode terminals 12 and the busbar 18 is sandwiched between head parts of the bolts and the electrode terminals 12, whereby the electrode terminals 12 and the busbar 18 are electrically connected.

(External Connection Busbar 20)

Figure 2:
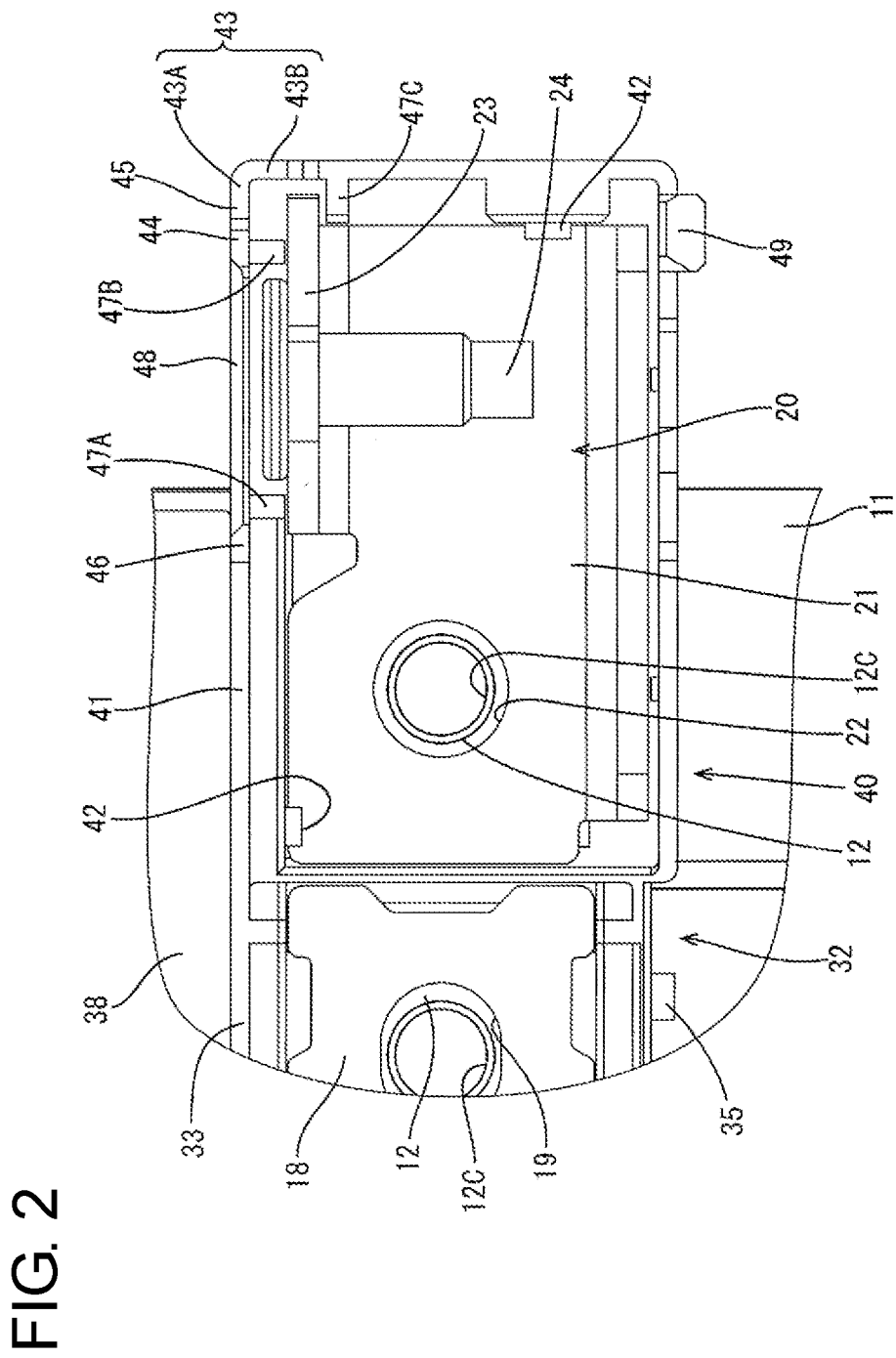
FIG. 2 is an enlarged plan view of a second holding portion in FIG. 1.
Figure 3:
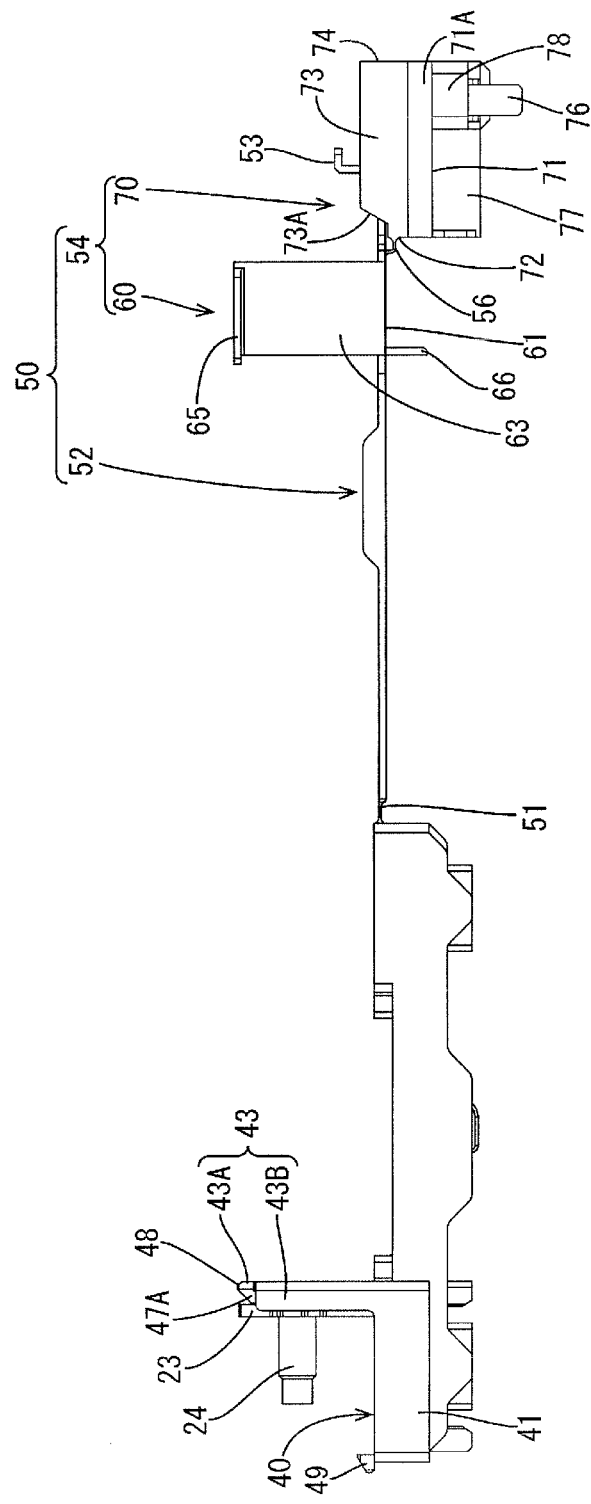
FIG. 3 is a right side view showing the state of FIG. 1.

The external connection busbar 20 is made of metal such as copper, copper alloy, stainless steel (SUS) or aluminum, and includes a base portion 21 to be connected to the electrode terminal 12 on the end part of series connection of the unit cells 11, an erected portion 23 perpendicularly erected from the base portion 21 and the connection terminal 24 (an example of an external connection terminal) projecting in a perpendicular direction along the base portion 21 from the erected portion 23 as shown in FIGS. 2 and 3.

The base portion 21 is in the form of a substantially rectangular plate similarly to the busbar 18 and a through hole 22 for connection to the electrode terminal 12 of the unit cell 11 is formed at a position thereof near one end (near the left end of FIG. 2) in a longitudinal direction of the base portion 21. Further, the plate-like erected portion 23 erected in the perpendicular direction from the base portion 21 is provided on one (upper side of FIG. 2) of a pair of lateral edges near the other end (near the right end of FIG. 2) in the longitudinal direction. A standing dimension of the erected portion 23 is set to be longer than a width of the base portion 21 in a short side direction (see FIG. 3). Further, near the upper end of the erected portion 23, the bolt-like connection terminal 24 is provided to penetrate through the erected portion 23 and project from a plate surface of the erected portion 23 toward a side where the base portion 21 is arranged. The connection terminal 24 is a terminal to be electrically connected to an external device (other device) such as an inverter.

(Resin Protector 31)

The resin protector 31 is made of synthetic resin and includes, as shown in FIG. 1, first holding portions 32 for accommodating and holding the busbars 18 and second holding portions 40 for accommodating and holding the external connection busbars 20.

The first holding portions 32 are arranged side by side in a lateral direction of FIG. 1 so that the busbars 18 can be arranged side by side and held in a longitudinal direction thereof. Each first holding portion 32 is surrounded by a first peripheral wall 33, and the contact of a tool or the like with the electrode terminals 12 and the busbar 18 to cause a short circuit can be prevented by this first peripheral wall 33. Further, openings (not shown) through which the rectangular tube shaped nuts (square nut) of the aforementioned electrode terminals 12 are insertable are provided on a bottom part of the first holding portion 32.

Further, the first peripheral wall 33 is formed with two first holding protrusions 34 arranged above the busbar 18 accommodated in the first holding portion 32, having a function of holding the busbar 18 together with the unillustrated bottom part and projecting inwardly of the first holding portion 32.

As shown in FIG. 1, the plurality of first holding portions 32 are arranged side by side for each electrode group 15 (two rows). A plurality of first holding portions 32 arranged on a lower side in FIG. 1 are one less than a plurality of first holding portions 32 arranged on an upper side in FIG. 1, and the upper and lower first holding portions 32 are arranged to be shifted by half the width of the unit cell 11. The rows of the first holding portions 32 arranged on the upper and lower sides are coupled and united by a coupling portion 38.

The second holding portions 40 are arranged at opposite end parts of the plurality of first holding portions 32 arranged on the lower side in FIG. 1 (one is not shown). The second holding portion 40 is dimensioned to be able to accommodate the base portion 21 of the external connection busbar 20 and includes a second peripheral wall 41 (an example of a holding wall) surrounding the base portion 21, a bottom part (not shown) on which the base portion 21 is placed, and a second holding protrusion 42 for holding the base portion 21 together with the bottom part.

An opening through which the rectangular tube shaped nut (square nut) of the aforementioned electrode terminal 12 is insertable is provided in an area of the bottom part corresponding to the through hole 22 of the external connection busbar 20 (not shown).

As enlargedly shown in FIG. 2, an erected wall 43 (an example of an interfering portion) extends upward (toward the front side with respect to the plane of FIG. 2) from the upper end of the second peripheral wall 41 on parts of the second peripheral wall 41 behind and to the right of the erected portion 23 with the external connection busbar 20 accommodated in the second holding portion 40. More specifically, the erected wall 43 is arranged at upper and right sides of the erected portion 23 in FIG. 2 and L-shaped, and stands upward from the second peripheral wall 41. In the following description, a part of the erected wall 43 located behind the erected portion 23 is referred to as a first wall portion 43A and a part located at the right side of the erected portion 23 is referred to as a second wall portion 43B.

Figure 5:
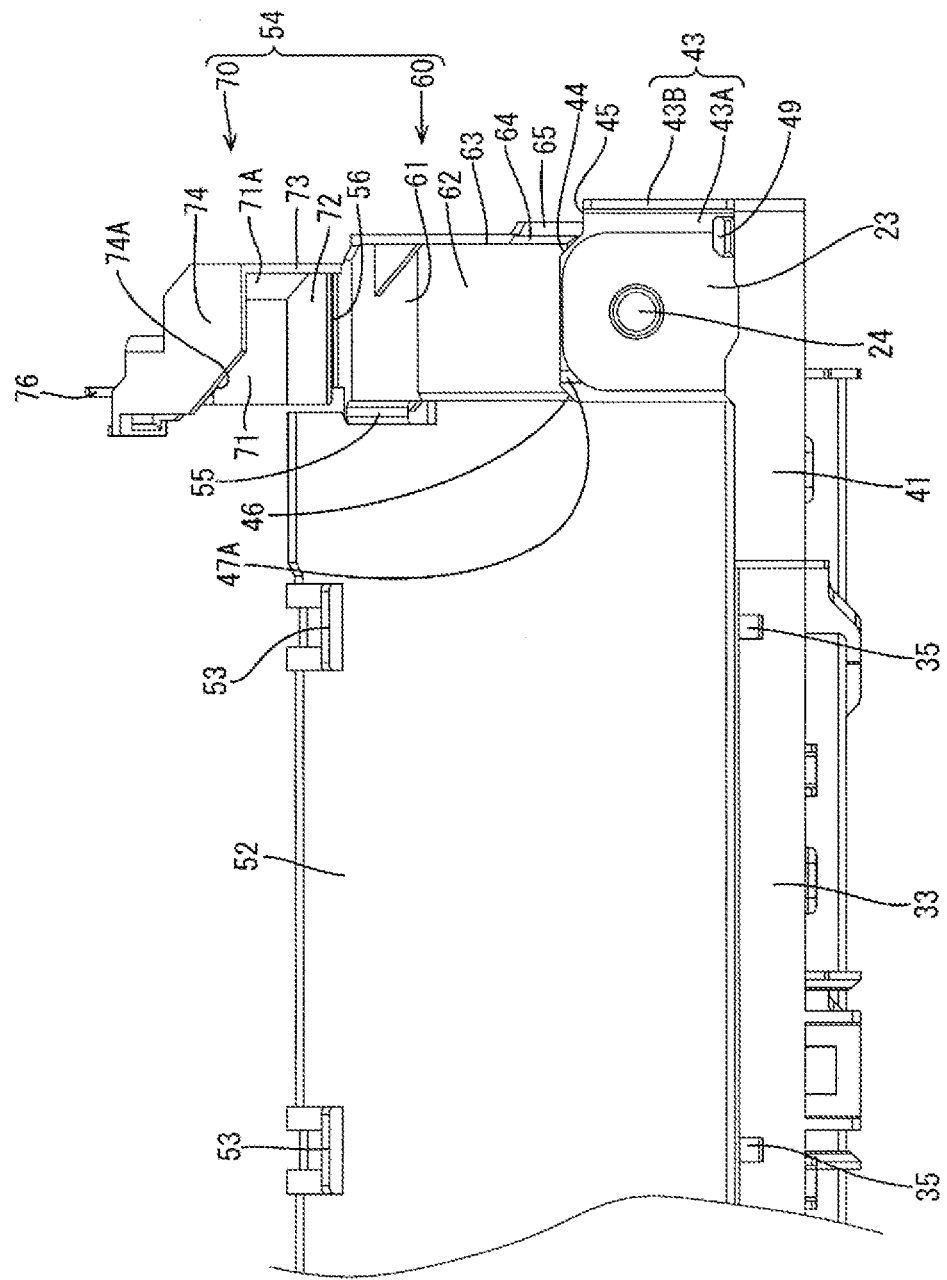
FIG. 5 is a front view showing a state of FIG. 4.

As shown in a front view of FIG. 5, the first wall portion 43A is set to be slightly higher than the erected portion 23 of the external connection busbar 20 with the external connection busbar 20 accommodated in the second holding portion 40. Further, a right upper corner part in FIG. 5 is stepped and formed into a first guiding portion 44 (an example of a posture guiding portion) inclined down toward the right and a horizontal portion 45 connected to the first guiding portion 44 and extending in a horizontal direction. On the other hand, a second guiding portion 46 (an example of a rotation guiding portion) inclined down toward the left is formed on a left upper corner part in FIG. 5. Further, as shown in FIGS. 2 and 3, a rear edge part of the upper end surface of the first wall portion 43A is formed into an inclined portion 48 obliquely cut toward the bottom.

A reinforcing rib 47A projecting inwardly of the second holding portion 40 (forward) is provided to extend in a vertical direction at a position of the first wall portion 43A near the left end in FIG. 5. As shown in FIG. 3, the upper surface of the reinforcing rib 47A is inclined down toward the front. Further, a first positioning protrusion 47B projecting the same amount as the reinforcing rib 47A is likewise provided inwardly of the second holding portion 40 (forward) on a lower side near the right end in FIG. 5 (see FIG. 2).

On the other hand, the second wall portion 43B has the same height as the horizontal portion 45 of the first wall portion 43A. The second wall portion 43B is so set that the front end surface thereof is located slightly behind the front surface of the erected portion 23 with the external connection busbar 20 accommodated in the second holding portion 40.

A height of the second peripheral wall 41 other than in an area where the erected wall 43 is provided is equal to that of the first peripheral wall 33 of the first holding portion 32, thereby making it possible to prevent a tool or the like from contacting the electrode terminal 12 and the external connection busbar 20 to cause a short circuit. Further, a second positioning protrusion 47C projecting inwardly of the second holding portion 40 is provided at a position of the second peripheral wall 41 slightly before (below in FIG. 2) the front end surface of the second wall portion 43B.

Further, as shown in FIG. 3, a lock protrusion 49 projecting toward an upper front side from the upper surface to be locked to a resilient lock piece 75 to be described later is provided on a right end part of a wall portion of the second peripheral wall 41 arranged on a lower side in FIG. 2.

(Cover 50)

A main body hinge portion 51 is provided on the upper end of an outer surface of a wall portion located on a rear side of the peripheral wall 33 of each of the first holding portions 32 arranged side by side on the upper side in FIG. 1, and the cover 50 is integrally provided via these main body hinge portions 51 (see FIGS. 1 and 3).

The cover 50 is composed of a substantially rectangular plate-like main cover 52 for covering the entire first holding portions 32 and coupling portion 38 and substantially halves of the second holding portions 40 from above, and an auxiliary cover 54 for covering the remaining halves of the second holding portions 40 from above, front and side.

A plurality of U-shaped locking pieces 53 standing up perpendicularly from a plate surface of the main cover 52 are provided on an edge part of the main cover 52 opposite to the one coupled to the main body hinge portions 51, and these locking pieces 53 are lockable to locking protrusions 35 provided on outer surfaces of the first peripheral walls 33 of the first holding portions 32 arranged side by side on the lower side in FIG. 1 with the resin protector 31 covered from above by the main cover 52 rotated by the main body hinge portions 51.

A right upper corner part of the main cover 52 in FIG. 1 is cut in a stepped manner, and the auxiliary cover 54 is integrally provided to the main cover 52 via a first hinge portion 55 on a right edge part of this cut part. The auxiliary cover 54 is composed of a first auxiliary cover 60 and a second auxiliary cover 70.

The first auxiliary cover 60 includes a substantially rectangular first bottom portion 61 (an example of an interfered portion) connected to the first hinge portion 55, a first side wall portion 62 standing up in a perpendicular direction toward a front side with respect to the plane of FIG. 1 from a lower edge part in FIG. 1 out of edge parts intersecting with the first hinge portion 55 and a second side wall portion 63 standing up in a perpendicular direction toward the front side with respect to the plane of FIG. 1 from an edge part facing the first hinge portion 55, and has a box shape open toward the upper side, the left side and the front side with respect to the plane of FIG. 1.

A right upper corner part of the first bottom portion 61 in FIG. 1 is obliquely cut. Further, end surfaces (upper surfaces in FIG. 3) of the first and second side wall portions 62, 63 in a standing direction from the first bottom portion 61 are formed into inclined portions 64 (an example of the posture guiding portion) inclined inwardly (see FIG. 8). Furthermore, a rib 65 projecting outwardly is entirely formed over the outer surfaces of the inclined portions 64. Opposite end parts of the rib 65 are obliquely cut (see FIG. 1).

Figure 7:
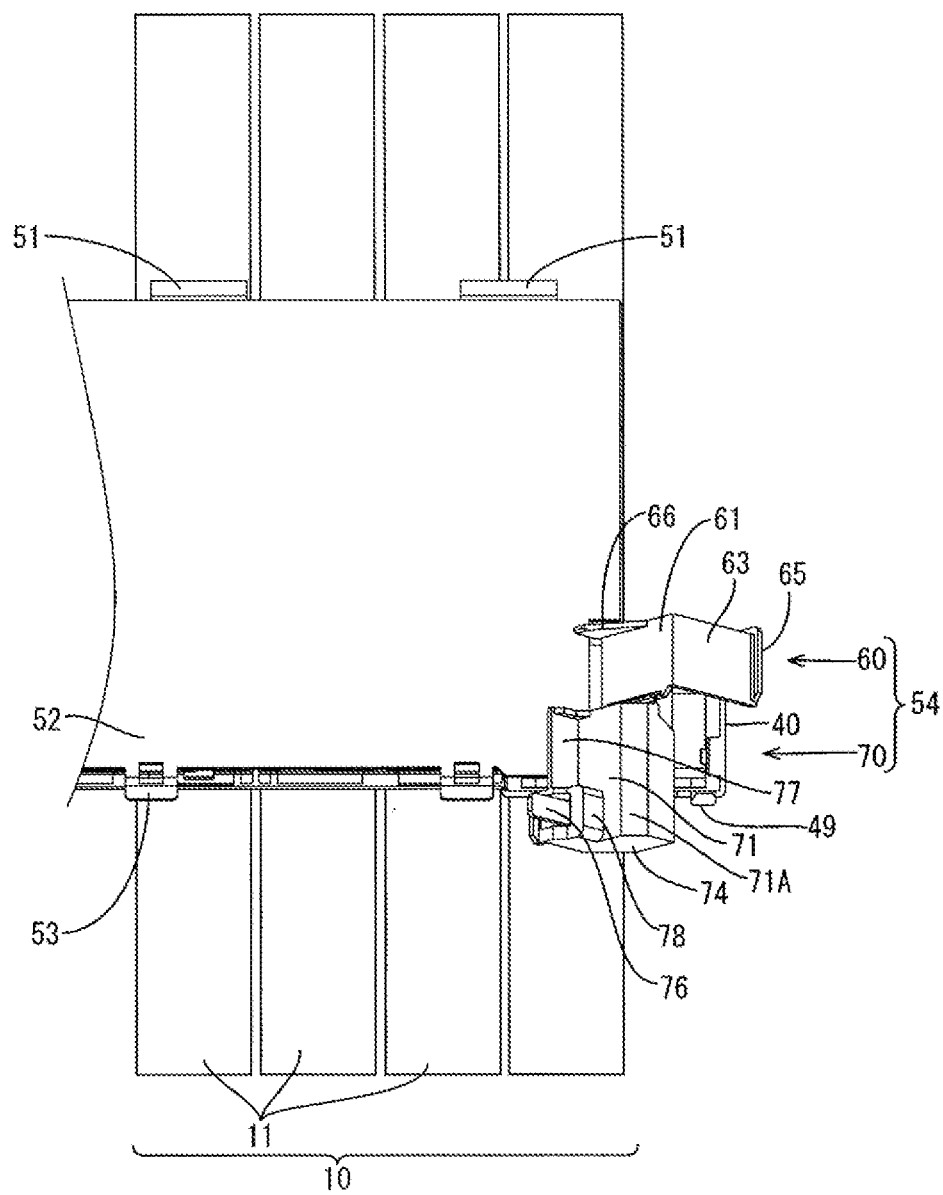
FIG. 7 is a plan view in the process of bending a first hinge portion.

On the other hand, a plate-like rotation restricting piece 66 (an example of a rotation restricting portion) extending toward a side opposite to the first side wall portion 62 is provided on an outer surface (lower surface in FIG. 3) of the first bottom portion 61 (see FIG. 7). This rotation restricting piece 66 is arranged along a lower edge part of the first bottom portion 61 in FIG. 1 and at a position near a left end, and a left end part thereof slightly projects from the first bottom portion 61 and stands up in a direction perpendicular to the first bottom portion 61.

This rotation restricting piece 66 is for restricting excessive bending of the first hinge portion 55. With the first auxiliary cover 60 rotated and the first hinge portion 55 bent outwardly by 90°, the rotation restricting piece 66 butts against the main cover 52 and supports the first bottom portion 61 perpendicularly to the main cover 52.

A second hinge portion 56 is provided on an edge part of the first bottom portion 61 located on an upper side in FIG. 1, and the second auxiliary cover 70 is integrally provided to the first auxiliary cover 60 via this second hinge portion 56. A hinge axis of the first hinge portion 55 and that of the second hinge portion 56 are orthogonal.

The second auxiliary cover 70 includes a second bottom portion 71 provided below the first bottom portion 61 of the first auxiliary cover 60 in FIG. 3, a third side wall portion 72 provided between the second bottom portion 71 and the second hinge portion 56, a fourth side wall portion 73 adjacent to and intersecting with a right side of the third side wall portion 72 in FIG. 1 and a fifth side wall portion 74 facing the third side wall portion 72, and has a flat box shape open toward the left side and the front side with respect to the plane of FIG. 1.

A substantially upper half of the second bottom portion 71 in FIG. 1 protrudes outwardly (upwardly in FIG. 1) from an edge part of the main cover 52. A lateral width of the second bottom portion 71 in FIG. 1 is set to be smaller than that of the first bottom portion in FIG. 1. Further, an intersecting part of the second bottom portion 71 and the fourth side wall portion 73 (corner part) is obliquely cut into an inclined portion 71A (see FIG. 5).

The resilient lock piece 75 lockable to the aforementioned lock protrusion 49 is provided in an area of the second bottom portion 71 protruding from a left upper edge part of the main cover 52 in FIG. 1. Further, a substantially tubular projecting portion 78 projecting toward a side (lower side in FIG. 3) opposite to the fourth side wall portion 73 is provided on the underside of the area of the second bottom portion 71 where this resilient lock piece 75 is provided, and a plate-like lock releasing piece 76 capable of releasing a locked state with the lock protrusion 49 by resiliently deforming the resilient lock piece 75 is provided on the projecting portion 78 (see FIG. 7).

Further, a plate-like sixth wall portion 77 extending in a direction (downward direction in FIG. 3) opposite to a standing direction of the fourth side wall portion 73 is provided on an edge part (left edge part in FIG. 1) of the second bottom portion 71 facing the edge part where the fourth side wall portion 73 is provided (see FIG. 7). The sixth wall portion 77 is connected to an outer surface of the projecting portion 78.

As shown in FIG. 3, the fourth and fifth side wall portions 73, 74 are set to have a height somewhat larger than that of the third side wall portion 72, so that the upper ends thereof are located at positions higher than the first bottom portion 61. Further, upper end corner parts of edge parts of the fourth and fifth side wall portions 73, 74 opposite to those intersecting with each other in FIG. 3 are respectively obliquely cut into inclined portions 73A, 74A (see FIGS. 3 and 5).

Next, how to assemble the wiring module 30 of this embodiment is described.

First, the respective busbars 18 are accommodated in the first holding portions 32 of the resin protector 31 and the external connection busbars 20 are accommodated and held in the second holding portions 40. At this time, when the busbars 18 and the base portions 21 of the external connection busbars 20 are fitted into the respective holding portions 32, 40 from above, the first and second holding protrusions 34, 42 are deflected and deformed. When the busbars 18 and the base portions 21 reach positions below the respective holding protrusions 34, 42, the respective holding protrusions 34, 42 resiliently return, whereby the respective busbars 18 and base portions 21 are held not to come out of the respective holding portions 32, 40 (see FIG. 1).

In this state, the erected portion 23 of the external connection busbar 20 is positioned by the reinforcing rib 47A, the first positioning protrusion 47B and the second positioning protrusion 47C as shown in FIG. 2.

When the busbars 18 and the external connection busbars 20 are accommodated at predetermined positions, the main cover 52 is subsequently rotated by the main body hinge portions 51 to cover the first holding portions 32 and parts of the second holding portions 40 from above.

Figure 4:
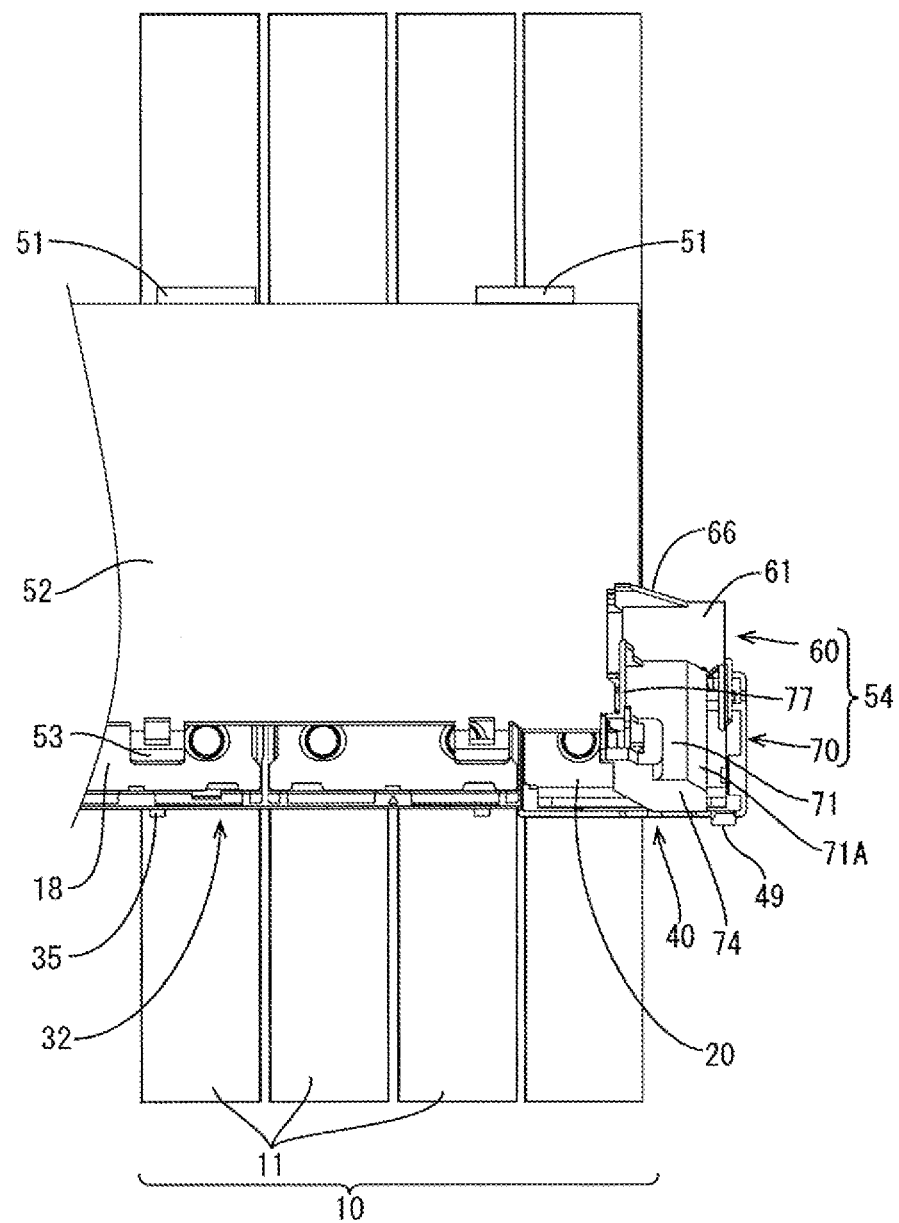
FIG. 4 is a plan view in the process of closing the lid portion.
Figure 6:
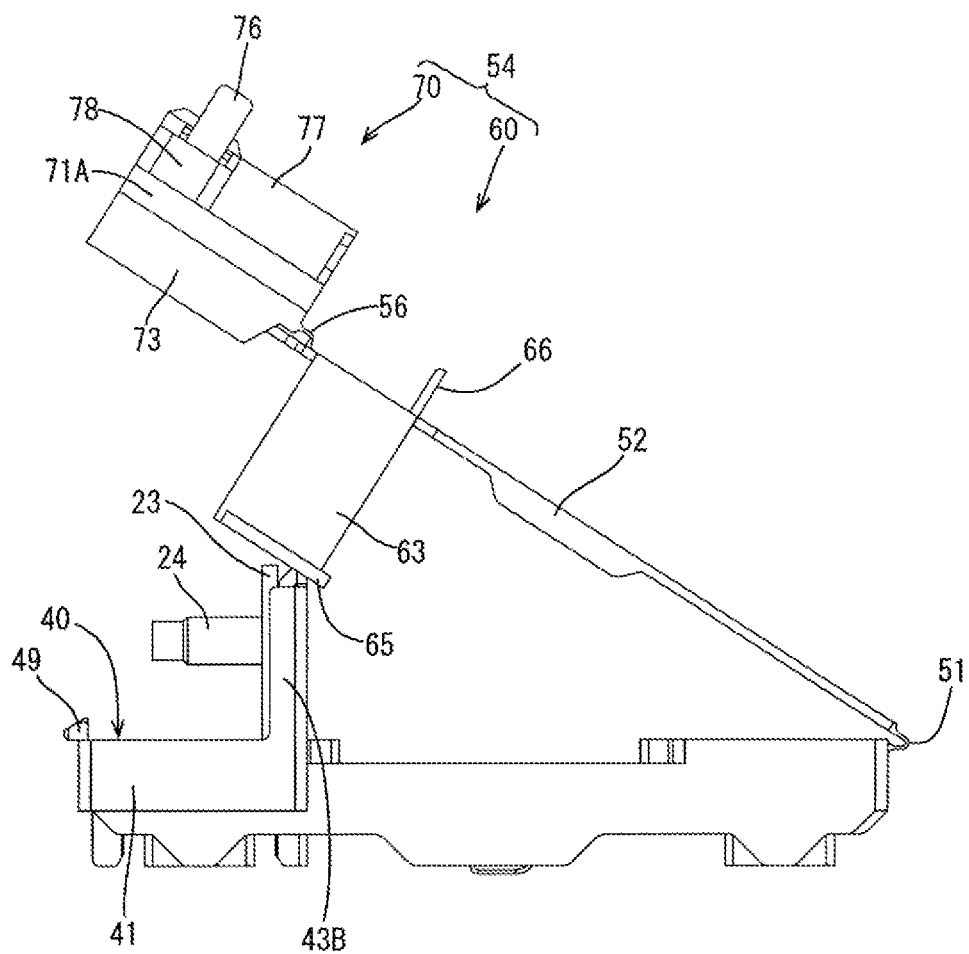
FIG. 6 is a right side view showing the state of FIG. 4.

Then, as shown in FIGS. 4 to 6, the inclined portion 64 of the second side wall portion 63 of the first auxiliary cover 60 slides in contact with the first guiding portion 44 of the erected wall 43 and the rib 65 slides in contact with the horizontal portion 45. In this way, the first auxiliary cover 60 is guided to have a proper posture with respect to the erected wall 43. Further, the second side wall portion 63 is arranged at an outer surface side of the second wall portion 43B of the erected wall 43. Eventually, the first bottom portion 61 butts against the inclined portion 48 of the erected wall 43.

Figure 8:
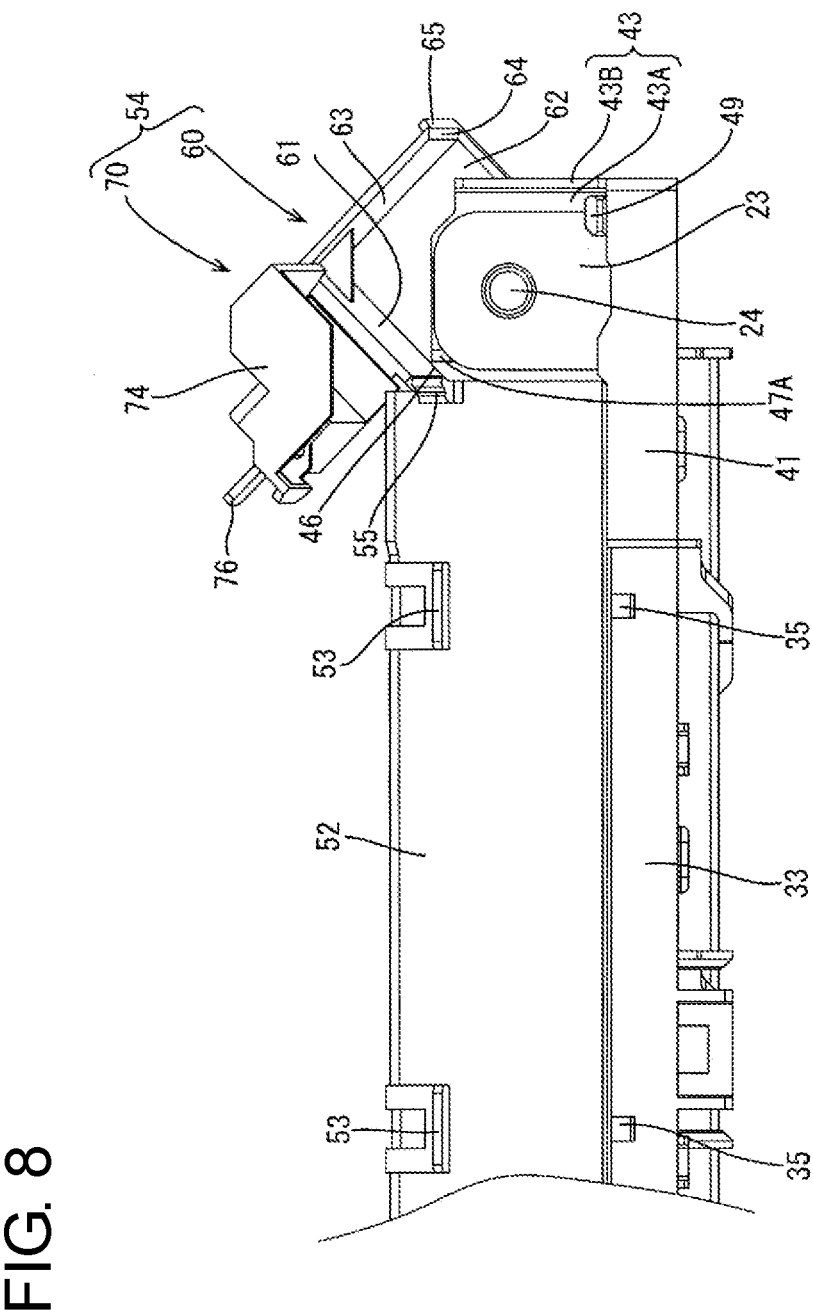
FIG. 8 is a front view showing a state of FIG. 7.
Figure 9:
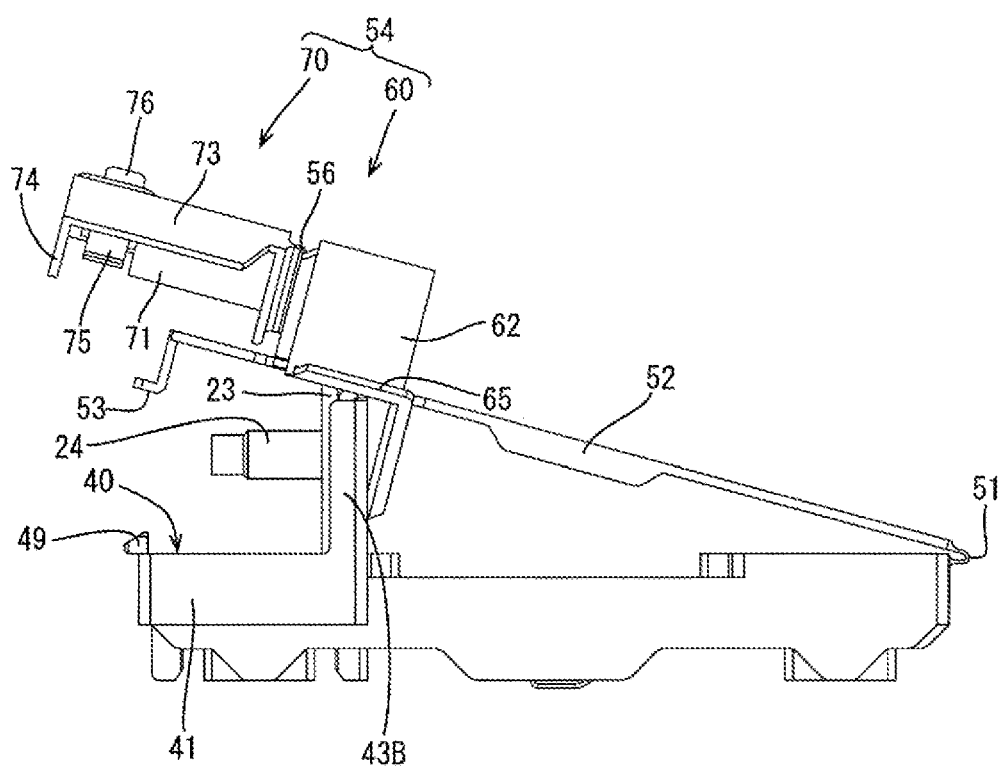
FIG. 9 is a right side view showing the state of FIG. 7.

When the main cover 52 is further rotated in a closing direction, the first bottom portion 61 interferes with the second guiding portion 46 of the erected wall 43, whereby the first hinge portion 55 is gradually bent outwardly (see FIGS. 7 to 9). Specifically, the first bottom portion 61 interferes with the second guiding portion 46 from the side of the first hinge portion 55 toward the side of the second side wall portion 63 and the first hinge portion 55 is gradually bent according to a movement of these interfering parts associated with the rotation of the main cover 52.

Although the first wall portion 43A of the erected wall 43 receives a force from the first bottom portion 61 at this time, the first wall portion 43 is not easily deformed since being provided with the reinforcing rib 47A.

Figure 10:
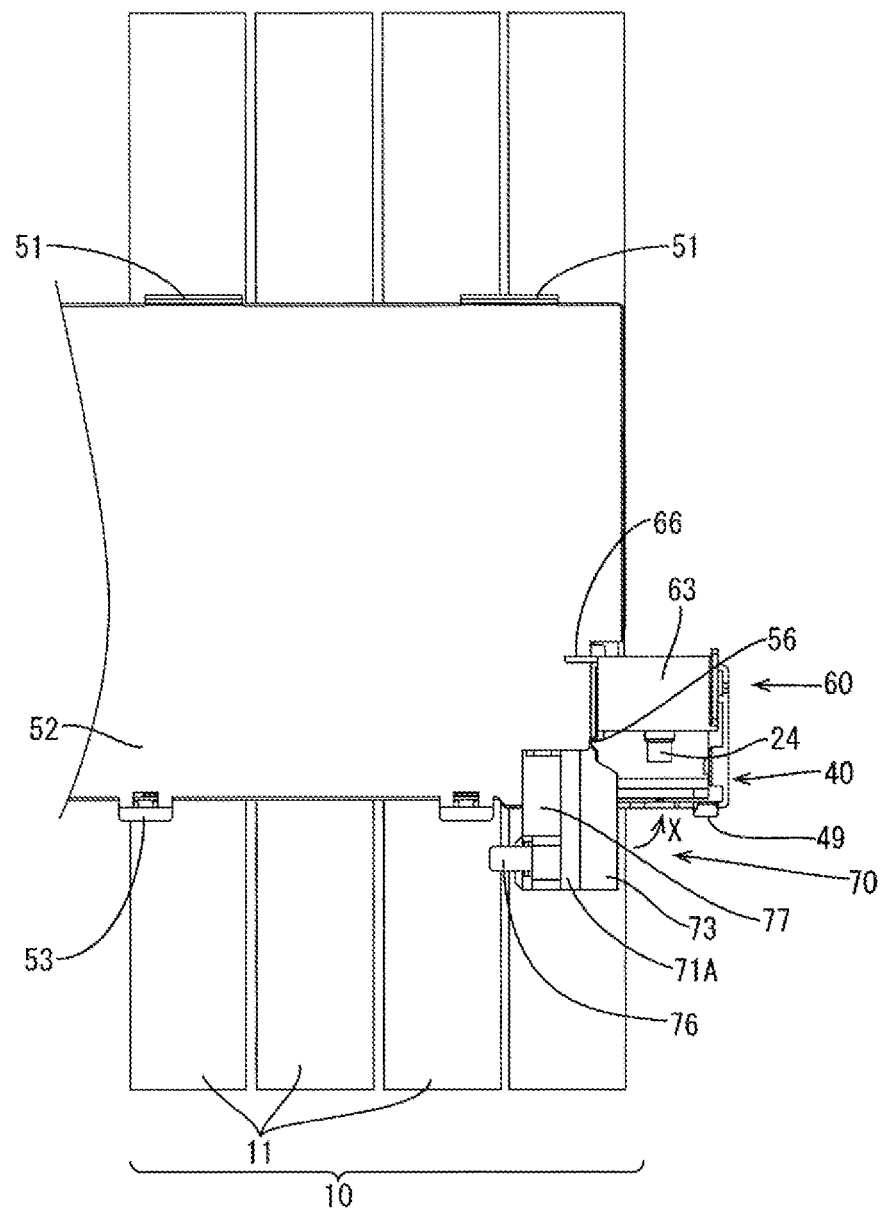
FIG. 10 is a plan view showing a state where the first hinge portion is bent.
Figure 11:
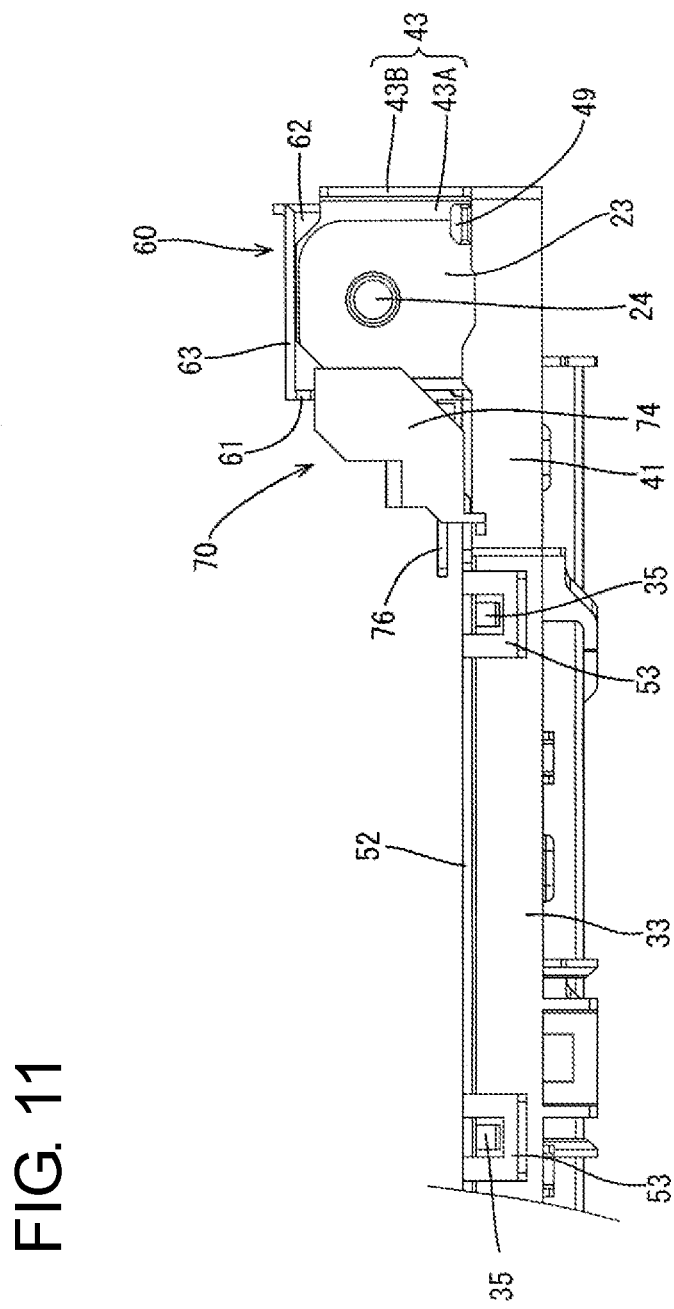
FIG. 11 is a front view showing a state of FIG. 10.
Figure 12:
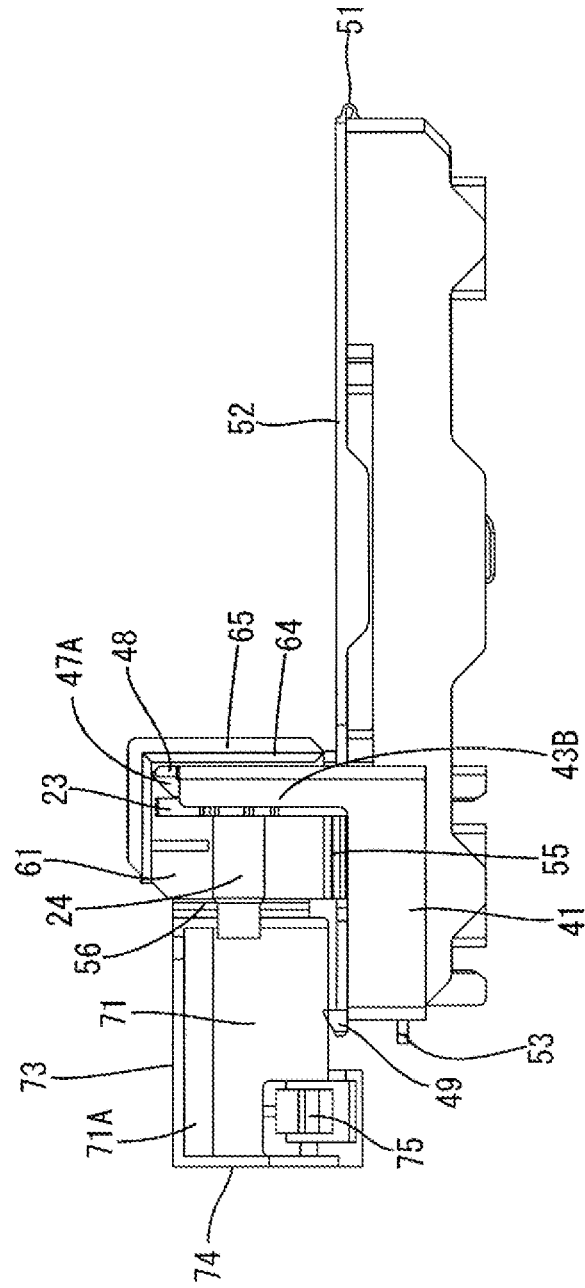
FIG. 12 is a right side view showing the state of FIG. 10.

As the rotation of the main cover 52 proceeds and the main cover 52 is set in a closing state for completely closing the first holding portions 32 and the parts of the second holding portions 40, the first hinge portion 55 is bent at a right angle as shown in FIGS. 10 to 12. At this time, the first hinge portion 55 is not bent by an angle larger than a right angle since the rotation restricting portion 66 provided on the outer surface of the first bottom portion 61 butts against the upper surface of the main cover 52.

In a state where the main cover 52 is completely closed in this way, the locking pieces 53 of the main cover 52 are locked to the locking protrusions 35. Specifically, the main cover 52 is fixed to the resin protector 31.

In this state, the first auxiliary cover 60 is arranged at a predetermined position for covering the second holding portion 40. Specifically, the first auxiliary cover 60 is in such a state where the first bottom portion 61 thereof covers a left part of the connection terminal 24, the first side wall portion 62 covers the back surface of the erected wall 43 and the second side wall portion 63 covers an upper part of the connection terminal 24.

Further, at this time, the second auxiliary cover 70 is rotatable with respect to the first auxiliary cover 60. Preferably, as shown in FIG. 10, the second auxiliary cover 70 is in an initial state, i.e. a state where the third side wall portion 72 is perpendicular to the first bottom portion 61 of the first auxiliary cover 60. In this state, the resilient lock piece 75 (projecting portion 78) is arranged outside the resin protector 31 (main cover 52) (see FIGS. 10 and 12).

Further, in such a state (state of FIGS. 10 to 12), a front side, a right side and an upper tip side of the connection terminal 24 are exposed. Specifically, the connection terminal 24 is completely exposed on two sides, i.e. on the front and right sides and can be connected and disconnected to and from a mating connection terminal.

Figure 13:
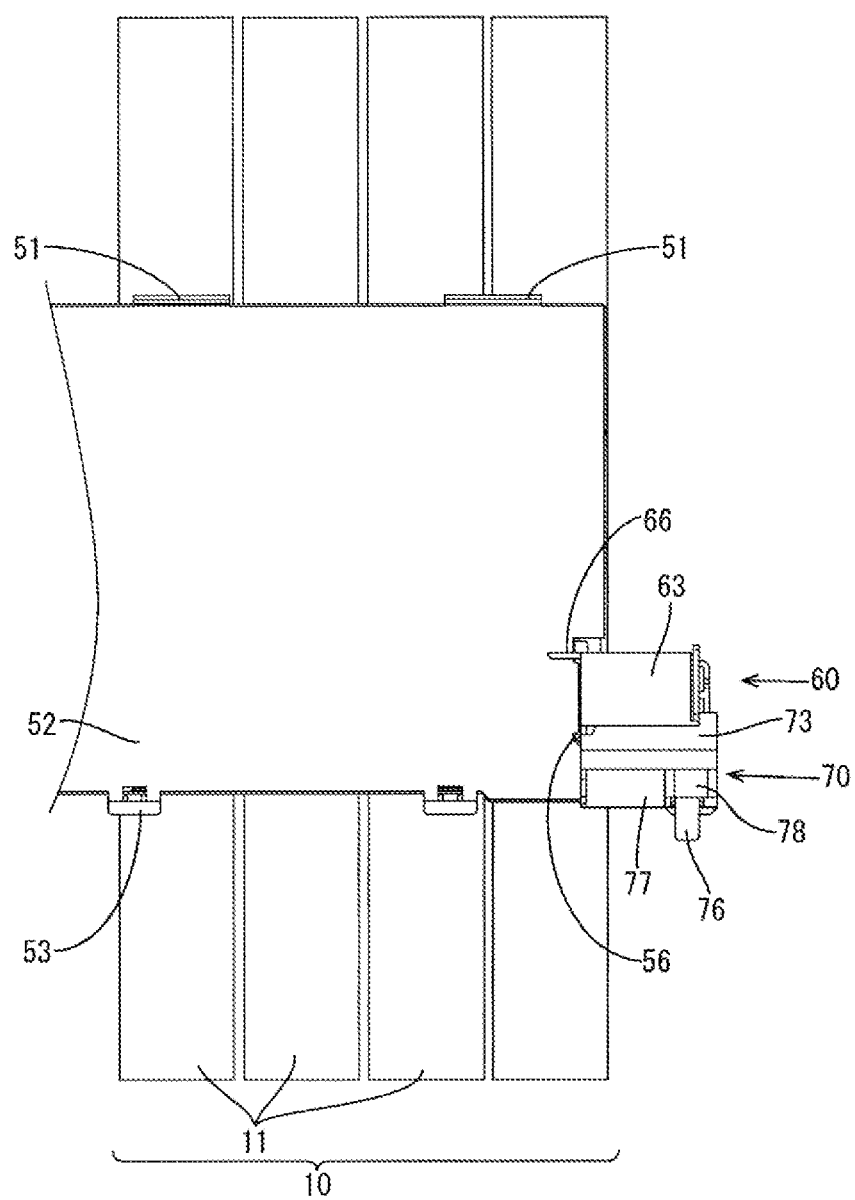
FIG. 13 is a plan view showing a state where a second lid portion is closed.
Figure 14:
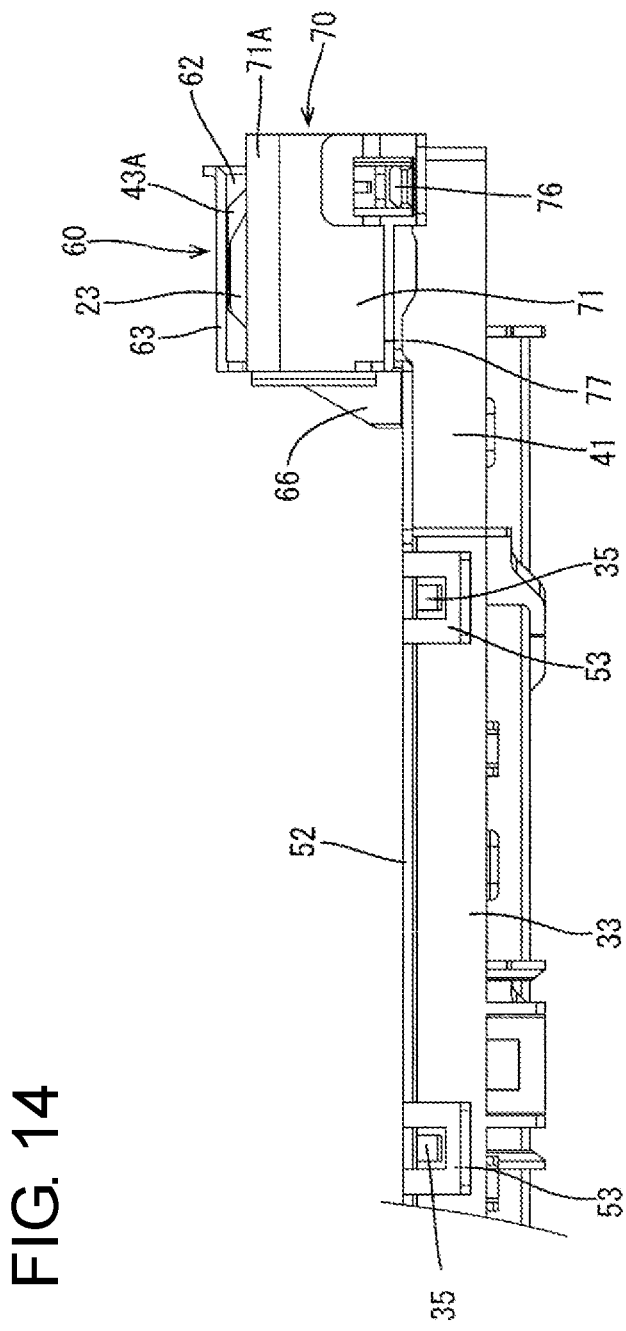
FIG. 14 is a front view showing a state of FIG. 13.
Figure 15:
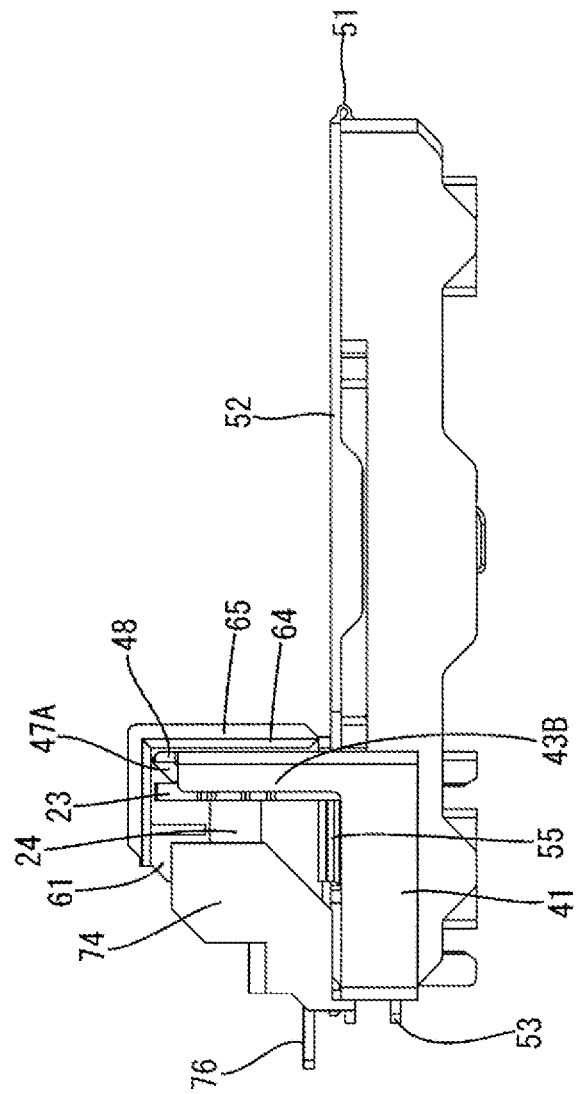
FIG. 15 is a right side view showing the state of FIG. 13.

Subsequently, the second auxiliary cover 70 is rotated in a direction X in FIG. 10 by the second hinge portion 56 and the second hinge portion 56 is bent. Then, as shown in FIGS. 13 to 15, the third side wall portion 72 covers a left side of the tip part of the connection terminal 24, the second bottom portion 71 covers the front surface of the connection terminal 24, the fifth side wall portion 74 covers a right part of the connection terminal 24, the fourth side wall portion 73 covers an upper part of the tip part of the connection terminal 24 and the sixth wall portion 77 and the projecting portion 78 cover a part of the base portion 21 from above.

Further, at this time, an end edge part of a tip side of the fourth side wall portion 73 in the rotating direction is fitted below the second side wall portion 63 while being guided along the inclined portion 73A. In this state, the resilient lock piece 75 is locked to the lock protrusion 49 of the second holding portion 40. In this way, the second auxiliary cover 70 is fixed at a predetermined position for covering the second holding portion 40. Specifically, the second holding portion 40 and the entire external connection busbar 20 accommodated in the second holding portion 40 are covered in an insulated state by the auxiliary cover 54 while leaving a clearance provided at a right side of the connection terminal 24 for leading out the wire.

In exposing the connection terminal 24 covered by the auxiliary cover 54 in this way and connecting or disconnecting it to or from the mating terminal, the lock releasing piece 76 is first pressed to release the locked state of the resilient lock piece 75 and the lock protrusion 49. Then, the second auxiliary cover 70 is rotated by the second hinge portion 56 to set the auxiliary cover 70 in an open state and the exposed connection terminal 24 and the mating connection terminal may be connected or disconnected.

According to this embodiment, the following functions and effects are exhibited.

According to the wiring module 30 of this embodiment, the first auxiliary cover 60 is automatically rotated by the interference of the first bottom portion 61 with the erected wall 43 as the main cover 52 is rotated with respect to the resin protector 31, and arranged at the predetermined position for covering the second holding portion 40 with the main cover 52 completely closed. Thus, it is not necessary to rotate and fix the first auxiliary cover 60, the structure thereof can be simplified and man-hours can be reduced.

Further, since the erected wall 43 and the first bottom portion 61 originally necessary to cover the second holding portion 40 are interfered with each other, new interfering portion and interfered portion need not be provided and the configuration can be simple.

Further, the inclined portion 64 is provided on the second side wall portion 63 of the first auxiliary cover 60, the first guiding portion 44 is provided on the first wall portion 43A of the erected wall 43 and the first auxiliary cover 60 is guided to have a proper posture prior to the rotation of the first auxiliary cover 60 by causing the inclined portion 64 and the first guiding portion 44 to slide in contact with each other. In this way, the first bottom portion 61 of the first auxiliary cover 60 and the erected wall 43 come into contact in proper postures and the interference smoothly proceeds.

In addition, since the erected wall 43 is formed with the inclined second guiding portion 46 for guiding the rotation of the first auxiliary cover 60 by coming into contact with the first bottom portion 61, the first auxiliary cover 60 is more smoothly rotated.

Further, since the first auxiliary cover 60 is provided with the rotation restricting piece 66 for restricting excessive rotation of the first auxiliary cover 60, the first auxiliary cover 60 is stably arranged at the predetermined position for covering the second holding portion 40 in the closed state where the main cover 52 is locked to the resin protector 31.

Furthermore, since the main cover 52 is integrally provided to the resin protector 31 via the main body hinge portions 51, the number of components can be reduced.

As just described, according to this embodiment, it is possible to provide the wiring module 30 having a simple configuration and a small number of man-hours.

The present invention is not limited to the above described and illustrated embodiment. For example, the following embodiments are also included in the technical scope of the present invention.

Although the first auxiliary cover 60 is automatically rotated according to the rotation of the main cover 52 with respect to the resin protector 31 by causing the erected wall 43 of the second holding portion 40 and the first bottom portion 61 of the first auxiliary cover 60 to interfere with each other in the above embodiment, the second holding portion 40 and the first auxiliary cover 60 may be separately provided with an interfering portion and an interfered portion configured to interfere with each other.

Although the first auxiliary cover 60 is provided with the rotation restricting piece 66 for restricting excessive rotation of the first auxiliary cover 60 in the above embodiment, the rotation restricting piece 66 may be provided on the main cover 52 or may not necessarily be provided.

Although the resin protector 31 and the main cover 52 are integrally provided via the main body hinge portions 51 in the above embodiment, the cover 50 may not necessarily be integrally provided to the resin protector 31 and may be a separate body.

The forms of the external connection busbar 20 and the second holding portion 40 are not limited to those of the above embodiment and can be appropriately changed.

Although the erected wall 43 is provided with the inclined first and second guiding portions 44, 46 in the above embodiment, the guiding portions may not necessarily be provided.

LIST OF REFERENCE SIGNS

10 . . . unit cell group (electrical storage element group)
11 . . . unit cell (electrical storage element)
12 . . . electrode terminal
12A . . . positive terminal
12B . . . negative terminal
18 . . . busbar (connecting member)
20 . . . external connection busbar (external connecting member)
21 . . . base portion
23 . . . erected portion
24 . . . connection terminal (external connection terminal)
30 . . . wiring module
31 . . . resin protector (insulating holding member)
32 . . . first holding portion
40 . . . second holding portion
41 . . . second peripheral wall (holding wall)
43 . . . erected wall (interfering portion)
44 . . . first guiding portion (posture guiding portion)
46 . . . second guiding portion (rotation guiding portion)
51 . . . main body hinge portion
52 . . . main cover
54 . . . auxiliary cover
55 . . . first hinge portion
56 . . . second hinge portion
60 . . . first auxiliary cover
61 . . . first bottom portion (wall portion)
64 . . . inclined portion (posture guiding portion)
66 . . . rotation restricting piece
70 . . . second auxiliary cover

The invention claimed is:

1. A wiring module to be mounted on an electrical storage element group formed by arranging a plurality of electrical storage elements including positive and negative electrode terminals, comprising:
a connecting member for connecting between adjacent ones of the electrode terminals;
an external connecting member including an external connection terminal to be connected to another device;
an insulating holding member including a first holding portion for holding the connecting member and a second holding portion for holding the external connecting member; and
a main cover for covering the first holding portion, the main cover being integrally hinged to the insulating holding member via a main body hinge; and
an auxiliary cover for covering the second holding portion,
the auxiliary cover including a first auxiliary cover integrally connected to the main cover via a first hinge that is perpendicular to the main body hinge and a second auxiliary cover integrally coupled to the first auxiliary cover via a second hinge perpendicular to the first hinge, wherein:
the first auxiliary cover includes an interfered portion for interfering with an interfering portion provided on the insulating holding member as the main cover is rotated about the main body hinge and into a mounted disposition on the insulating holding member, the interference of the interfering portion and the interfered portion causing the first auxiliary cover to rotate about the first hinge and relative to the main cover so that the first auxiliary cover is guided to a predetermined position as the main cover is rotated into the mounted disposition on the insulating holding member.

2. The wiring module of claim 1, wherein:
the external connecting member includes a base an erected portion erected from the base and the external connection terminal projecting from a first surface of the erected portion, and the second holding portion including a holding wall surrounding the base;
the interfering portion is an erected wall erected from the holding wall for covering a second surface of the erected portion that is opposite to the first surface of the erected portion from which the external connection terminal projects; and
the interfered portion is a wall of the first auxiliary cover connected to the first hinge.

3. The wiring module of claim 2, wherein the erected wall is formed with an inclined rotation guiding portion for guiding the rotation of the first auxiliary cover by coming into contact with the wall of the first auxiliary cover that defines the interfered portion.

4. The wiring module of claim 3, wherein the first auxiliary cover and the second holding portion are provided with posture guiding portions for bringing the interfered portion of the first auxiliary cover in a proper posture into contact with the interfering portion prior to the rotation of the first auxiliary cover.

5. The wiring module of claim 4, wherein the first auxiliary cover includes a rotation restricting portion for restricting excessive rotation of the first auxiliary cover.

6. A wiring module to be mounted on an electrical storage element group formed by arranging a plurality of electrical storage elements including positive and negative electrode terminals, comprising:
a connecting member for connecting between adjacent ones of the electrode terminals;
an external connecting member including an external connection terminal to be connected to another device;
an insulating holding member including a first holding portion for holding the connecting member and a second holding portion for holding the external connecting member;
a main cover for covering the first holding portion; and
an auxiliary cover for covering the second holding portion, the auxiliary cover including a first auxiliary cover connected to the main cover via a first hinge and a second auxiliary cover integrally coupled to the first auxiliary cover via a second hinge perpendicular to the first hinge, the first auxiliary cover including an interfered portion for interfering with an interfering portion provided on the insulating holding member as the main cover is mounted on the insulating holding member, the first auxiliary cover is rotated with the first hinge portion as a rotary axis by the interference of the interfering portion and the interfered portion, and the first auxiliary cover is arranged at a predetermined position with the main cover mounted on the insulating holding member, wherein the first auxiliary cover and the second holding portion are provided with posture guiding portions for bringing the interfered portion of the first auxiliary cover in a proper posture into contact with the interfering portion prior to the rotation of the first auxiliary cover.

7. The wiring module of claim 6, wherein the main cover is hinged integrally to the insulating holding member via a main body hinge portion.

8. The wiring module to be mounted on an electrical storage element group formed by arranging a plurality of electrical storage elements including positive and negative electrode terminals, comprising:

a connecting member for connecting between adjacent ones of the electrode terminals;

an external connecting member including an external connection terminal to be connected to another device;

an insulating holding member including a first holding portion for holding the connecting member and a second holding portion for holding the external connecting member;

a main cover for covering the first holding portion; and an auxiliary cover for covering the second holding portion, the auxiliary cover including a first auxiliary cover connected to the main cover via a first hinge and a second auxiliary cover integrally coupled to the first auxiliary cover via a second hinge perpendicular to the first hinge, the first auxiliary cover including an interfered portion for interfering with an interfering portion provided on the insulating holding member as the main cover is mounted on the insulating holding member, the first auxiliary cover is rotated with the first hinge portion as a rotary axis by the interference of the interfering portion and the interfered portion, and the first auxiliary cover is arranged at a predetermined position with the main cover mounted on the insulating holding member, wherein the first auxiliary cover includes a rotation restricting portion for restricting excessive rotation of the first auxiliary cover.

9. The wiring module of claim 8, wherein the main cover is hinged integrally to the insulating holding member via a main body hinge.

* * * * *